US011067770B2

(12) United States Patent
Fujiwara

(10) Patent No.: US 11,067,770 B2
(45) Date of Patent: Jul. 20, 2021

(54) IMAGE PICKUP UNIT AND IMAGE PICKUP APPARATUS FOR HOLDING LENS GROUP MOVABLY IN OPTICAL AXIS DIRECTION

(71) Applicant: CANON KABUSHIKI KAISHA, Tokyo (JP)

(72) Inventor: Daisuke Fujiwara, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 249 days.

(21) Appl. No.: 16/180,505

(22) Filed: Nov. 5, 2018

(65) Prior Publication Data
US 2019/0137730 A1 May 9, 2019

(30) Foreign Application Priority Data

Nov. 8, 2017 (JP) .............................. JP2017-215593

(51) Int. Cl.
G02B 7/10 (2021.01)
G02B 7/02 (2021.01)
(Continued)

(52) U.S. Cl.
CPC ............... *G02B 7/10* (2013.01); *G02B 7/006* (2013.01); *G02B 7/021* (2013.01); *G03B 3/10* (2013.01);
(Continued)

(58) Field of Classification Search
CPC . G02B 7/08; G02B 7/10; G02B 21/26; G02B 7/04; G02B 7/09; G02B 7/102; G02B 27/646; G02B 7/14; G02B 7/006; G02B 7/021; G02B 7/282; G02B 7/40; H02N 2/0015; H02N 2/026; H02N 2/103; H02N 2/0055; H02N 2/008; H02N 2/001; H02N 2/0065; H02N 2/0075; H02N 2/006;
(Continued)

(56) References Cited

U.S. PATENT DOCUMENTS 8,218,250 B2* 7/2012 Nakamura ............. G02B 7/102
359/700
2005/0001905 A1* 1/2005 Shinomiya ........... H04N 5/2251
348/207.99
(Continued)

FOREIGN PATENT DOCUMENTS

| CN | 1731233 A | 2/2006 |
| CN | 102023366 A | 4/2011 |
| JP | 2012027057 A | 2/2012 |

OTHER PUBLICATIONS

Office Action issued in Chinese Appln. No. 201811319095.8 dated Jan. 6, 2021. English translation provided.

*Primary Examiner* — Brandi N Thomas
(74) *Attorney, Agent, or Firm* — Rossi, Kimms & McDowell LLP

(57) ABSTRACT

An image pickup unit including a lens barrel having a plurality of first holding members holding optical components, respectively. The image pickup unit includes two vibration-type linear actuators each configured to drive different driving objects in an optical axis direction of the lens barrel. One of the two vibration-type linear actuators drives at least one of the first holding members in the optical axis direction of the lens barrel. The two vibration-type linear actuators are disposed on a first side surface parallel to an optical axis of the lens barrel.

11 Claims, 9 Drawing Sheets

(51) Int. Cl.
*G02B 7/00* (2021.01)
*G03B 5/00* (2021.01)
*G03B 3/10* (2021.01)
G03B 17/55 (2021.01)
H04N 5/225 (2006.01)
G03B 11/00 (2021.01)

(52) U.S. Cl.
CPC ............... *G03B 5/00* (2013.01); *G03B 11/00* (2013.01); *G03B 17/55* (2013.01); *G03B 2205/0046* (2013.01); *G03B 2205/0061* (2013.01); *G03B 2205/0084* (2013.01); *H04N 5/2253* (2013.01); *H04N 5/2254* (2013.01)

(58) Field of Classification Search
CPC .......... H02N 2/106; H02N 2/145; H02N 2/06; H02N 2/14; H02N 2/142; H02N 2/0085; H02N 2/065; H02N 2/12; H02N 2/163; H02N 2/0045; H02N 2/028; H02N 2/123; H02N 2/22
See application file for complete search history.

(56) References Cited

U.S. PATENT DOCUMENTS

2006/0272328 A1* 12/2006 Hara ...................... G03B 5/00
 60/527
2012/0019933 A1 1/2012 Nakamura \* cited by examiner

IMAGE PICKUP UNIT AND IMAGE PICKUP APPARATUS FOR HOLDING LENS GROUP MOVABLY IN OPTICAL AXIS DIRECTION

BACKGROUND OF THE INVENTION

Field of the Invention

The present invention relates to an image pickup unit and an image pickup apparatus for holding lens group movably in optical axis direction.

Description of the Related Art

Conventionally, an image pickup apparatus in which a camera unit for shooting a subject is covered by a casing such as a dome and is supported to be rotatable around a pan axis and a tilt axis, a direction of the camera unit is changed to a shooting direction desired by a user, and the subject can be shot is known. For the image pickup apparatus, performance improvement and size reduction of an image pickup unit (camera unit) are required. However, for example, if performance of a lens barrel constituting the image pickup unit is improved for the purpose of optimizing a taking lens and increasing zoom magnification, according to a size increase of an image pickup device, an optical path length of the lens barrel increases. As a result, a size of the entire image pickup apparatus including the image pickup unit and the casing covering the image pickup unit increases. Therefore, a lens barrel that performs zooming by moving a plurality of lens groups linearly in an optical axis direction using a cam ring is known as the lens barrel that improves the performance of the image pickup unit and realizes miniaturization.

For example, Japanese Laid-Open Patent Publication (kokai) No. 2012-27057 describes a lens barrel that includes a subject-side lens group moving in an optical axis direction, an intermediate fixing lens group not moving in the optical axis direction, and an image pickup device moving in the optical axis direction. In the lens barrel, the subject-side lens group is driven in the optical axis direction by the cam ring and the image pickup device is held to be linearly movable in the optical axis direction by two guide bars. As at least one of a driving source for rotating the cam ring and a driving source for linearly driving the image pickup device, a vibration-type linear actuator is used.

However, in the lens barrel described in Japanese Laid-Open Patent Publication (kokai) No. 2012-27057, the fixing lens group is provided at the intermediate side and the cam ring is rotationally driven by three vibration-type linear actuators disposed on a fixing lens holding barrel, such that circumference is equally divided by approximately 120°. For this reason, a size of the entire lens barrel increases. In addition, Japanese Laid-Open Patent Publication (kokai) No. 2012-27057 does not describe a configuration in which performance of an electric wiring line for inputting and outputting an electric signal with respect to the image pickup device or a heat dissipation member for dissipating a heat generated by the image pickup device is prevented from being deteriorated, even if the image pickup device is repeatedly moved in the optical axis direction. For this reason, it is not easy to enhance durability of the image pickup apparatus while suppressing an increase in the size of the casing when the image pickup apparatus is accommodated in the casing.

SUMMARY OF THE INVENTION

The present invention provides an image pickup unit, which is capable of suppressing a size of the image pickup unit from increasing and enhancing durability.

Accordingly, the present invention provides an image pickup unit including a lens barrel having a plurality of first holding members holding optical components, respectively, the image pickup unit including two vibration-type linear actuators each configured to drive different driving objects in an optical axis direction of the lens barrel, wherein one of the two vibration-type linear actuators drives at least one of the first holding members in the optical axis direction of the lens barrel, wherein the two vibration-type linear actuators are disposed on a first side surface parallel to an optical axis of the lens barrel.

According to the present invention, it is possible to suppress a size of an image pickup unit from increasing and it is possible to enhance durability of the image pickup unit.

Further features of the present invention will become apparent from the following description of exemplary embodiments (with reference to the attached drawings).

DESCRIPTION OF THE EMBODIMENTS

Figure 1:
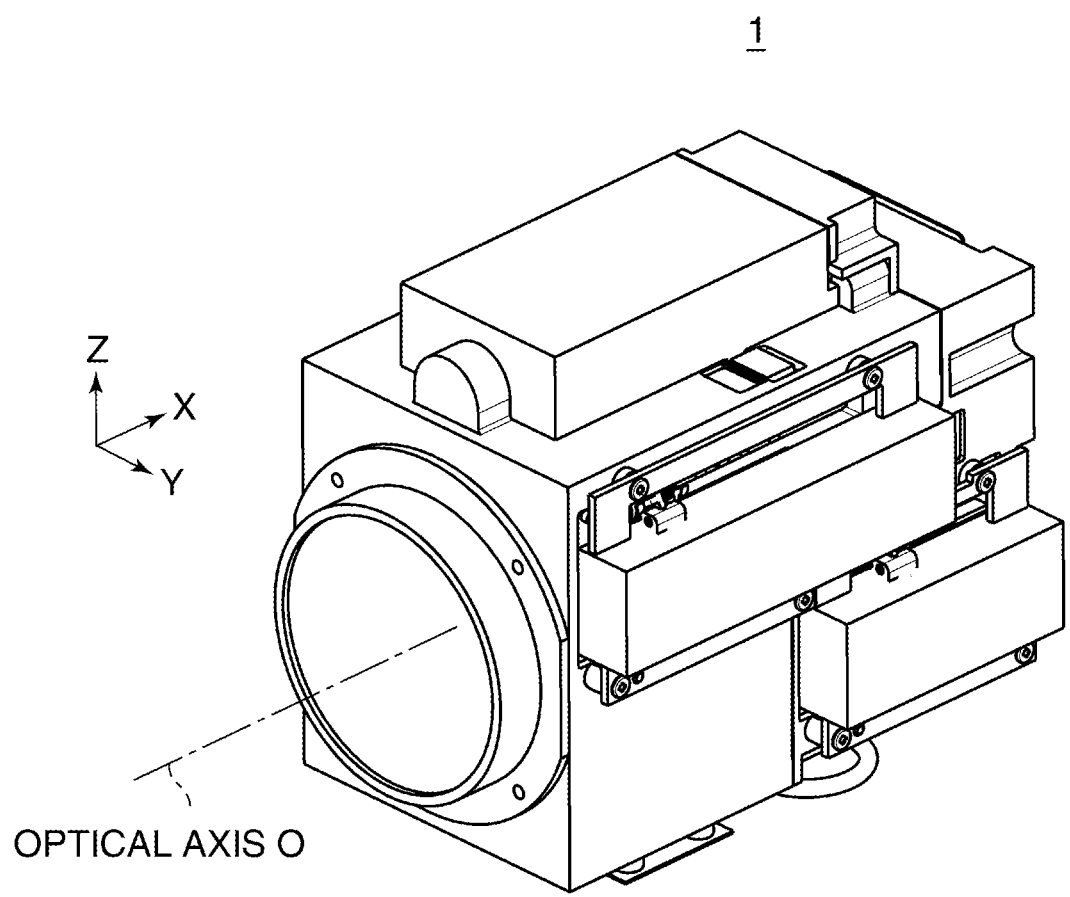
FIG. 1 is an external perspective view of an image pickup unit according to a first embodiment of the present invention.

Hereinafter, embodiments of the present invention will be described in detail with reference to the accompanying drawings. FIG. 1 is an external perspective view of an image pickup unit 1 according to a first embodiment of the present invention. For convenience of explanation, as shown in FIG. 1, an X axis, a Y axis, and a Z axis orthogonal to each other are defined. An axis parallel to a shooting optical axis (hereinafter, referred to as the "optical axis") of the image pickup unit 1 is defined as the X axis. When it is assumed that the X axis is parallel to a horizontal direction in the posture shown in FIG. 1, an axis parallel to a vertical direction is the Z axis and an axis orthogonal to the X axis and the Z axis and parallel to the horizontal direction is the Y axis.

Figure 2:
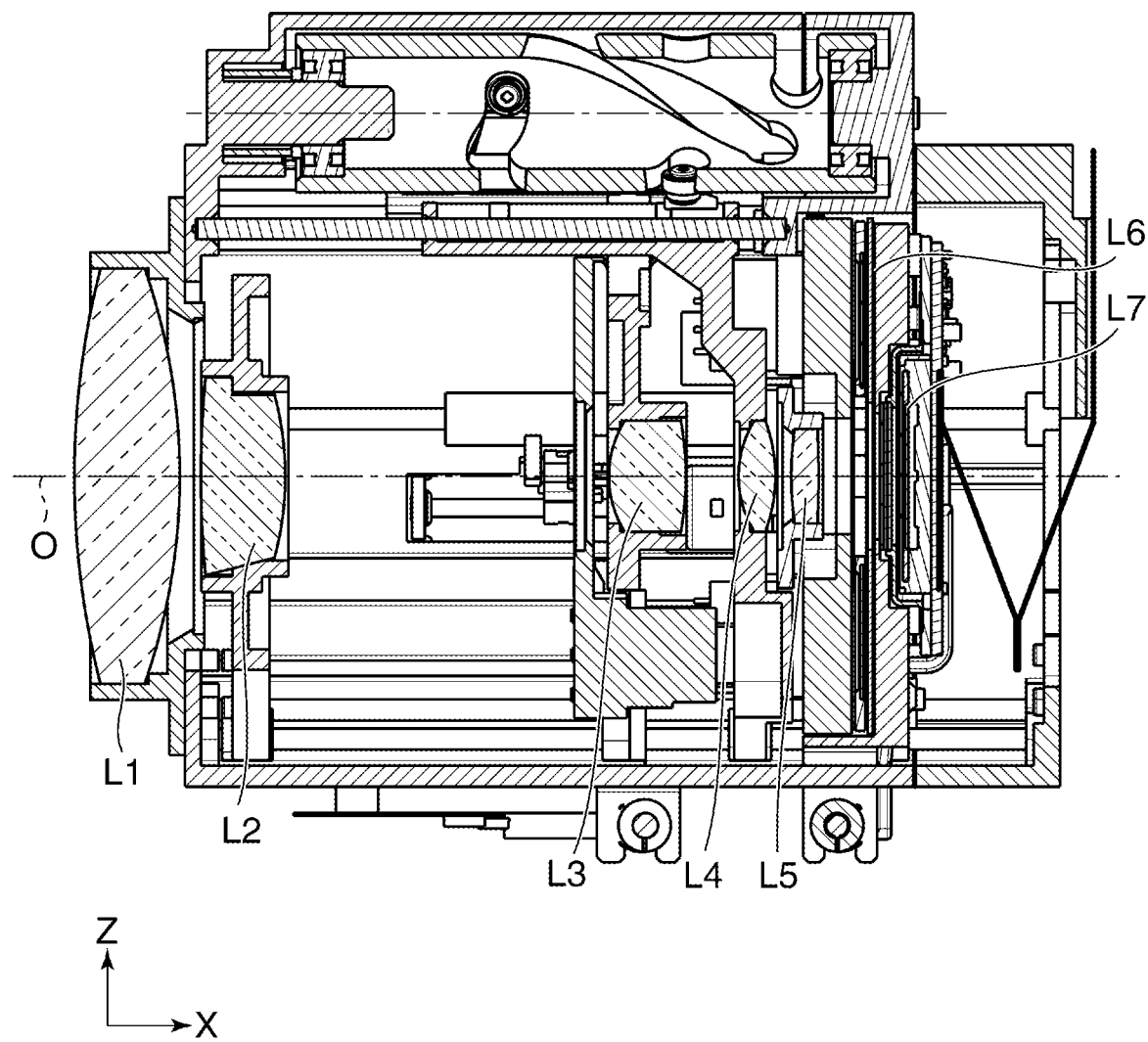
FIG. 2 is a cross-sectional view taken along a plane including an optical axis of the image pickup unit of FIG. 1.
Figure 3:
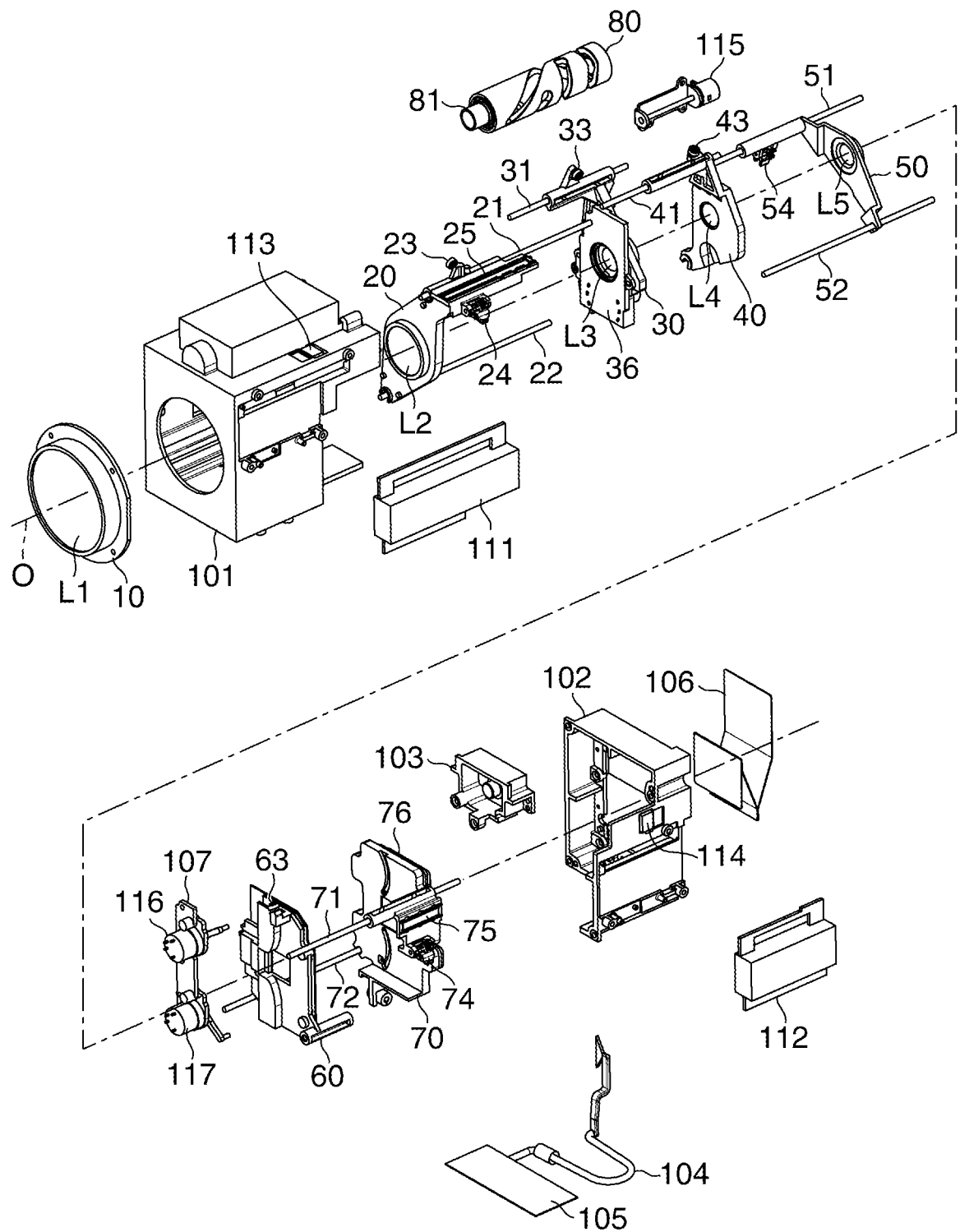
FIG. 3 is an exploded perspective view of the image pickup unit of FIG. 1.

FIG. 2 is a cross-sectional view showing the image pickup unit 1 cut along a plane including the optical axis and parallel to the Z axis. FIG. 3 is an exploded perspective view of the image pickup unit 1. The image pickup unit 1 includes optical components disposed sequentially from the subject side to form a lens barrel (shooting optical system), that is, a first group lens L1, a second group lens L2, a third group lens L3, a fourth group lens L4, a fifth group lens L5, and an optical filter L6. The image pickup unit 1 further includes an image pickup device L7 and light having passed through the lens barrel forms an image on the image pickup device L7.

The first group lens L1 is fixed not to be movable in the optical axis direction. The second group lens L2, the third group lens L3, and the fourth group lens L4 move in the optical axis direction and perform a zooming operation (zooming). The fifth group lens L5 moves in the optical axis direction and performs a focusing operation (focusing). The optical filter L6 is, for example, an IR cut filter or a band-pass filter and moves in a plane orthogonal to the optical axis and is inserted or extracted with respect to an optical path, thereby transmitting or blocking light in a specific wavelength region. The image pickup device L7 is a photoelectric conversion device such as a CCD sensor and a CMOS sensor.

The image pickup unit 1 includes a first group barrel 10, a second group barrel 20, guide bars 21 and 22, a cam follower 23, a rack member 24, a position detection scale 25, a third group barrel 30, a guide bar 31, a cam follower 33, a diaphragm unit 36, a fourth group barrel 40, and a guide bar 41. The image pickup unit 1 further includes a cam follower 43, a fifth group barrel 50, guide bars 51 and 52, a rack member 54, an optical filter holding frame 60, and a cam follower 63. The image pickup unit 1 further includes an image pickup device holding frame 70, guide bars 71 and 72, a rack member 74, a position detection scale 75, and a sensor substrate 76.

The first group barrel 10 is a holding member (first holding member) that holds the first group lens L1. The second group barrel 20 is a holding member (first holding member) that holds the second group lens L2. A sleeve part of the second group barrel 20 is engaged with the guide bar 21 to guide the second group barrel 20 in the optical axis direction and a U groove of the second group barrel 20 is engaged with the guide bar 22 to regulate rotation of the second group barrel 20 around the guide bar 21. The cam follower 23 is rotatably attached to the second group barrel 20. The rack member 24 and the position detection scale 25 are attached to the second group barrel 20.

The third group barrel 30 is a holding member (first holding member) that holds the third group lens L3. A sleeve part of the third group barrel 30 is engaged with the guide bar 31 to guide the third group barrel 30 in the optical axis direction and a U groove of the third group barrel 30 is engaged with the guide bar 22 to regulate rotation of the third group barrel 30 around the guide bar 31. The cam follower 33 is rotatably attached to the third group barrel 30. The diaphragm unit 36 is fixed to the third group barrel 30 and drives diaphragm blades to change an aperture diameter.

The fourth group barrel 40 is a holding member (first holding member) that holds the fourth group lens L4. A sleeve part of the fourth group barrel 40 is engaged with the guide bar 41 to guide the fourth group barrel 40 in the optical axis direction and a U groove of the fourth group barrel 40 is engaged with the guide bar 22 to regulate rotation of the fourth group barrel 40 around the guide bar 41. The cam follower 43 is rotatably attached to the fourth group barrel 40. The fifth group barrel 50 is a holding member that holds the fifth group lens L5. A sleeve part of the fifth group barrel 50 is engaged with the guide bar 51 to guide the fifth group barrel 50 in the optical axis direction and a U groove of the fifth group barrel 50 is engaged with the guide bar 52 to regulate rotation of the fifth group barrel 50 around the guide bar 51. The rack member 54 is attached to the fifth group barrel 50.

The optical filter holding frame 60 is a holding member (first holding member) that holds the optical filter L6. A sleeve part of the optical filter holding frame 60 is engaged with the guide bar 52 to guide the optical filter holding frame 60 in the optical axis direction and a U groove of the optical filter holding frame 60 is engaged with the guide bar 51 to regulate rotation of the optical filter holding frame 60 around the guide bar 52. The cam follower 63 is rotatably attached to the optical filter holding frame 60. The image pickup device holding frame 70 is a holding member (second holding member) that holds the image pickup device L7. The sensor substrate 76 is attached to the image pickup device holding frame 70. A sleeve part of the image pickup device holding frame 70 is engaged with the guide bar 71 to guide the image pickup device holding frame 70 in the optical axis direction and a U groove of the image pickup device holding frame 70 is engaged with the guide bar 72 to regulate rotation of the image pickup device holding frame 70 around the guide bar 71. The rack member 74 and the position detection scale 75 are attached to the image pickup device holding frame 70.

Figure 4:
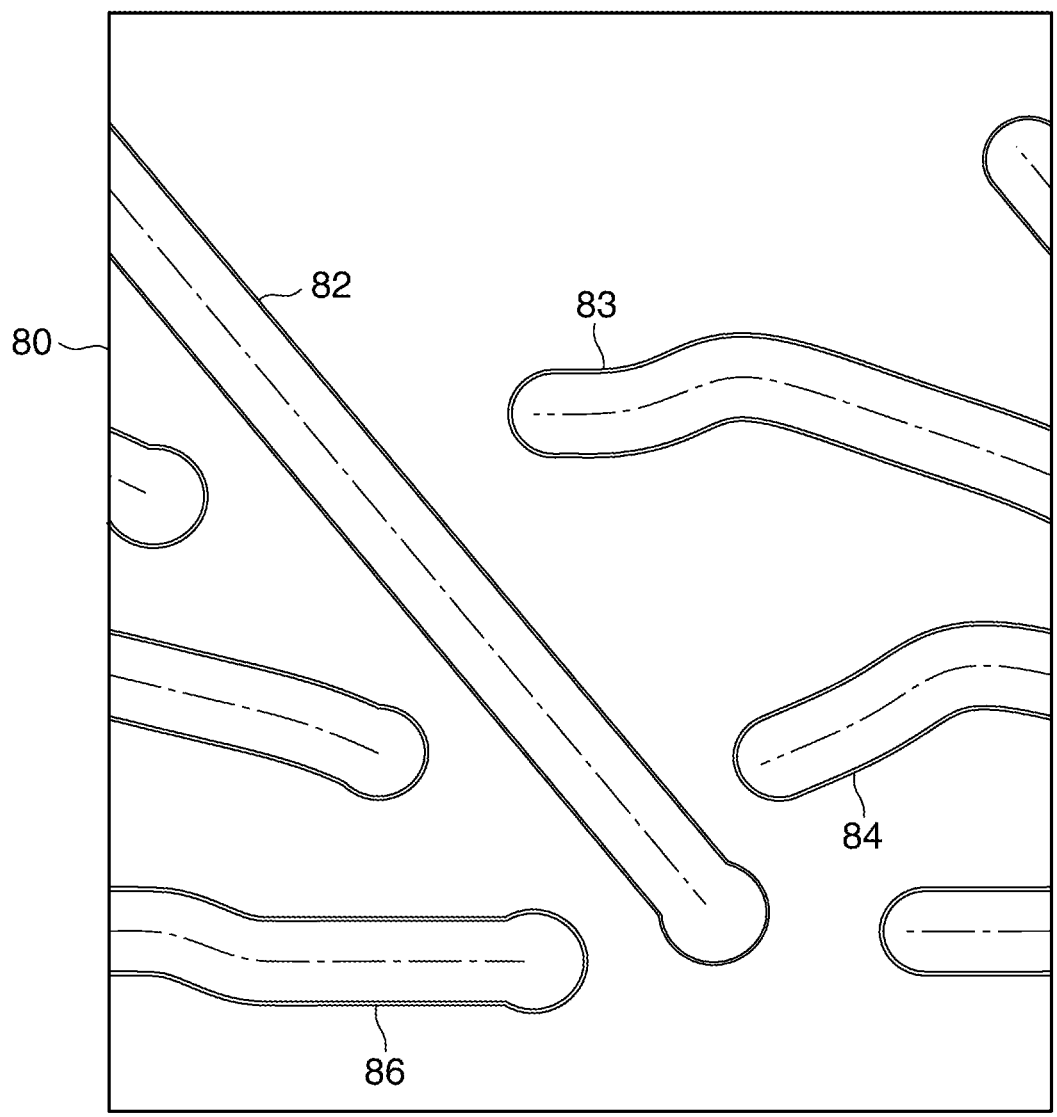
FIG. 4 is a development view showing cam grooves of a cam cylinder included in the image pickup unit of FIG. 1.

The image pickup unit 1 includes a cam cylinder 80. FIG. 4 is a development view showing cam grooves of the cam cylinder 80. A second group cam groove 82, a third group cam groove 83, a fourth group cam groove 84, and an optical filter cam groove 86 are formed on the cam cylinder 80. The second group cam groove 82 is engaged with the cam follower 23 of the second group barrel 20. The third group cam groove 83 is engaged with the cam follower 33 of the third group barrel 30. The fourth group cam groove 84 is engaged with the cam follower 43 of the fourth group barrel 40. The optical filter cam groove 86 is engaged with the cam follower 63 of the optical filter holding frame 60.

The image pickup unit 1 includes a fixation barrel 101 (fixation member), a rear part barrel 102, a guide bar holding member 103, an optical filter insertion and extraction motor holding member 107, a cam cylinder biasing member 81, optical sensors 113 and 114, and a stepping motor 115.

The first group barrel 10, the guide bar holding member 103, and the optical filter insertion and extraction motor holding member 107 are fixed to the fixation barrel 101. The guide bars 21, 22, 51, 52, 71, and 72 are sandwiched between the fixation barrel 101 and the rear part barrel 102. The guide bars 31 and 41 are sandwiched between the fixation barrel 101 and the guide bar holding member 103. The cam cylinder biasing member 81 biases the cam cylinder 80 in the optical axis direction. The cam cylinder 80 is rotatably sandwiched between the fixation barrel 101 and the rear part barrel 102 via the cam cylinder biasing member 81 and a rotation center axis of the cam cylinder 80 is parallel to the optical axis.

The optical sensor 113 is fixed to the fixation barrel 101 and the optical sensor 114 is fixed to the rear part barrel 102. The optical sensor 113 and the optical sensor 114 have the same structure. The optical sensor 113 has a light emitting part and a light receiving part, detects light of a periodical light/dark pattern reflected by the position detection scale 25 attached to the second group barrel 20, converts the light into an electric signal, and detects a position of the second group barrel 20. Similarly, the optical sensor 114 has a light emitting part and a light receiving part, detects light of a periodical light/dark pattern reflected by the position detection scale 75 attached to the image pickup device holding frame 70, converts the light into an electric signal, and detects a position of the image pickup device holding frame 70.

The image pickup unit 1 includes vibration-type linear actuators 111 and 112. The vibration-type linear actuators 111 and 112 include a slider and a vibrator (not shown in the drawings) that are relatively movable in the optical axis direction. The vibrator is formed by using a piezoelectric device (electrostrictive element), for example. However, the vibrator is not limited to a vibrator using the piezoelectric device. In the vibration-type linear actuators 111 and 112, if an alternating voltage signal of a predetermined frequency is input to the vibrator via a flexible printed board not shown in the drawings, a substantially spheroidal motion is excited in the vibrator and a thrust force (driving force) can be generated on a pressure contact surface with the slider. By the thrust force, a relative movement is generated in the slider and the vibrator.

The vibration-type linear actuator 111 is fixed to the fixation barrel 101 and a member movable in the optical axis direction in the slider and the vibrator is engaged with the rack member 24. If the thrust force of the optical axis direction is generated in the vibration-type linear actuator 111, the second group barrel 20 as a driving object moves in the optical axis direction via the rack member 24. If the second group barrel 20 moves in the optical axis direction, the cam cylinder 80 engaged with the cam follower 23 of the second group barrel rotates. If the cam cylinder 80 rotates, the third group barrel 30, the fourth group barrel 40, and the optical filter holding frame 60 move in the optical axis direction via the cam followers 33, 43, and 63 engaged with the cam cylinder 80. That is, a plurality of optical components (the second group lens L2, the third group lens L3, the fourth group lens L4, and the optical filter L6) can be driven in the optical axis direction by one vibration-type linear actuator 111.

The vibration-type linear actuator 112 is fixed to the rear part barrel 102 and a member movable in the optical axis direction in the slider and the vibrator is engaged with the rack member 74. If the thrust force of the optical axis direction is generated in the vibration-type linear actuator 112, the image pickup device holding frame 70 as a driving object can be moved in the optical axis direction via the rack member 74. Therefore, by driving the vibration-type linear actuators 111 and 112, the second group barrel 20, the third group barrel 30, the fourth group barrel 40, the optical filter holding frame 60, and the image pickup device holding frame 70 are moved in the optical axis, so that the zooming operation can be performed.

The stepping motor 115 is fixed to the fixation barrel 101 and is engaged with the rack member 54. If the stepping motor 115 is driven, the thrust force of the optical axis direction is generated and the fifth group barrel 50 is moved in the optical axis direction via the rack member 54, so that the focusing operation can be performed.

The image pickup unit 1 includes optical filter insertion and extraction motors 116 and 117, an electric wiring line 104, a lens substrate 105, and a heat conduction member 106. Because the optical filter insertion and extraction motors 116 and 117 are fixed to the optical filter insertion and extraction motor holding member 107, the optical filter insertion and extraction motors 116 and 117 are fixed to the fixation barrel 101 via the optical filter insertion and extraction motor holding member 107.

Figure 5:
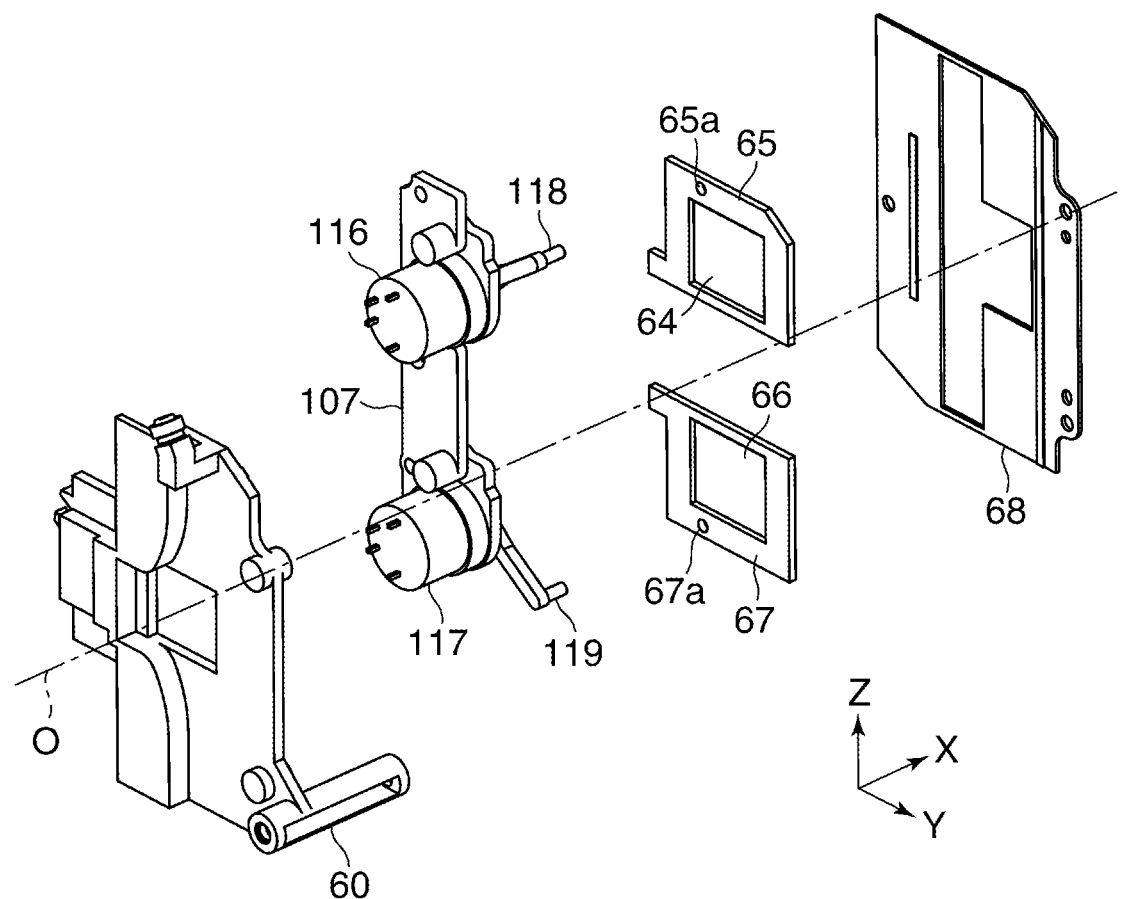
FIG. 5 is an exploded perspective view of an optical filter driving mechanism included in the image pickup unit of FIG. 1.

FIG. 5 is an exploded perspective view of an optical filter driving mechanism. The optical filter driving mechanism includes the optical filter insertion and extraction motors 116 and 117, the optical filter insertion and extraction motor holding member 107, an IR cut filter 64, filter holding frames 65 and 67, a band-pass filter 66, a cover member 68, and engagement arms 118 and 119.

The IR cut filter 64 has an optical characteristic of cutting infrared light. The filter holding frame 65 holds the IR cut filter 64. The band-pass filter 66 has an optical characteristic of transmitting light in a specific wavelength region. The filter holding frame 67 holds the band-pass filter 66. The cover member 68 holds the filter holding frames 65 and 67 to be movable in a plane orthogonal to the optical axis between the cover member 68 and the optical filter holding frame 60. The engagement arms 118 and 119 are coupled to the optical filter insertion and extraction motors 116 and 117, respectively. In addition, the engagement arms 118 and 119 are engaged with engagement holes 65a and 67a provided in the filter holding frames 65 and 67, respectively.

By driving the optical filter insertion and extraction motors 116 and 117 and rotating output shafts thereof around an axis parallel to the optical axis, the engagement arms 118 and 119 rotate and the filter holding frames 65 and 67 rotate. As a result, by controlling a rotation direction of the optical filter insertion and extraction motors 116 and 117, the filter holding frames 65 and 67 can be inserted and extracted with respect to the optical path. If the filter holding frame 65 (IR cut filter 64) is inserted into the optical path, light from which the infrared light has been cut is incident on the image pickup device L7. As a result, light suitable for generating a normal color image is obtained. If the filter holding frame 67 (band-pass filter 66) is inserted into the optical path, only light in a specific wavelength region such as near-infrared light is incident on the image pickup device L7, so that a higher contrast image can be generated. If the filter holding frames 65 and 67 are extracted from the optical path, light including the infrared light is incident on the image pickup device L7, so that a larger amount of light is obtained. For example, even under a low illumination environment such as the night time, shooting is enabled.

The lens substrate 105 is fixed to the fixation barrel 101, supplies power to components requiring power supplying via a flexible printed board not shown in the drawings, and inputs and outputs an electric signal between the components. Note that the components requiring the power supplying via the flexible printed board are the vibration-type linear actuators 111 and 112, the stepping motor 115, the optical filter insertion and extraction motors 116 and 117, the optical sensors 113 and 114, and the like. In a state in which the electric wiring line 104 connected to the lens substrate 105 is bent in a U shape, one end of the electric wiring line 104 is connected to the sensor substrate 76 and fixed and the other end thereof is connected to the lens substrate 105 and fixed. The electric wiring line 104 inputs and outputs an electric signal with respect to the image pickup device L7 held by the sensor substrate 76. A curvature of the electric wiring line 104 is designed such that the thrust force of the vibration-type linear actuator 112 necessary for moving the image pickup device holding frame 70 in the optical axis direction does not excessively increase.

The heat conduction member 106 is made of a flexible sheet member having high thermal conductivity such as a graphite sheet. One end of the heat conduction member 106 is fixed to the sensor substrate 76 and the other end thereof is fixed to a heat sink not shown in the drawings. The heat conduction member 106 is a heat dissipation part that suppresses a temperature rise of the image pickup device L7 by conducting heat generated by the sensor substrate 76 to the heat sink. The heat conduction member 106 is folded in a bellows shape to be expandable and contractible in the optical axis direction on the back surface side of the image pickup device holding frame 70, such that the thrust force of the vibration-type linear actuator 112 necessary for moving the image pickup device holding frame 70 in the optical axis direction does not excessively increase. Therefore, even if the image pickup device holding frame 70 holding the image pickup device L7 is moved repeatedly in the optical axis direction, damage applied to the heat conduction member 106 can be reduced. As a result, deterioration of the heat conduction member 106 can be suppressed. That is, durability of the heat conduction member 106 can be enhanced.

Figure 6:
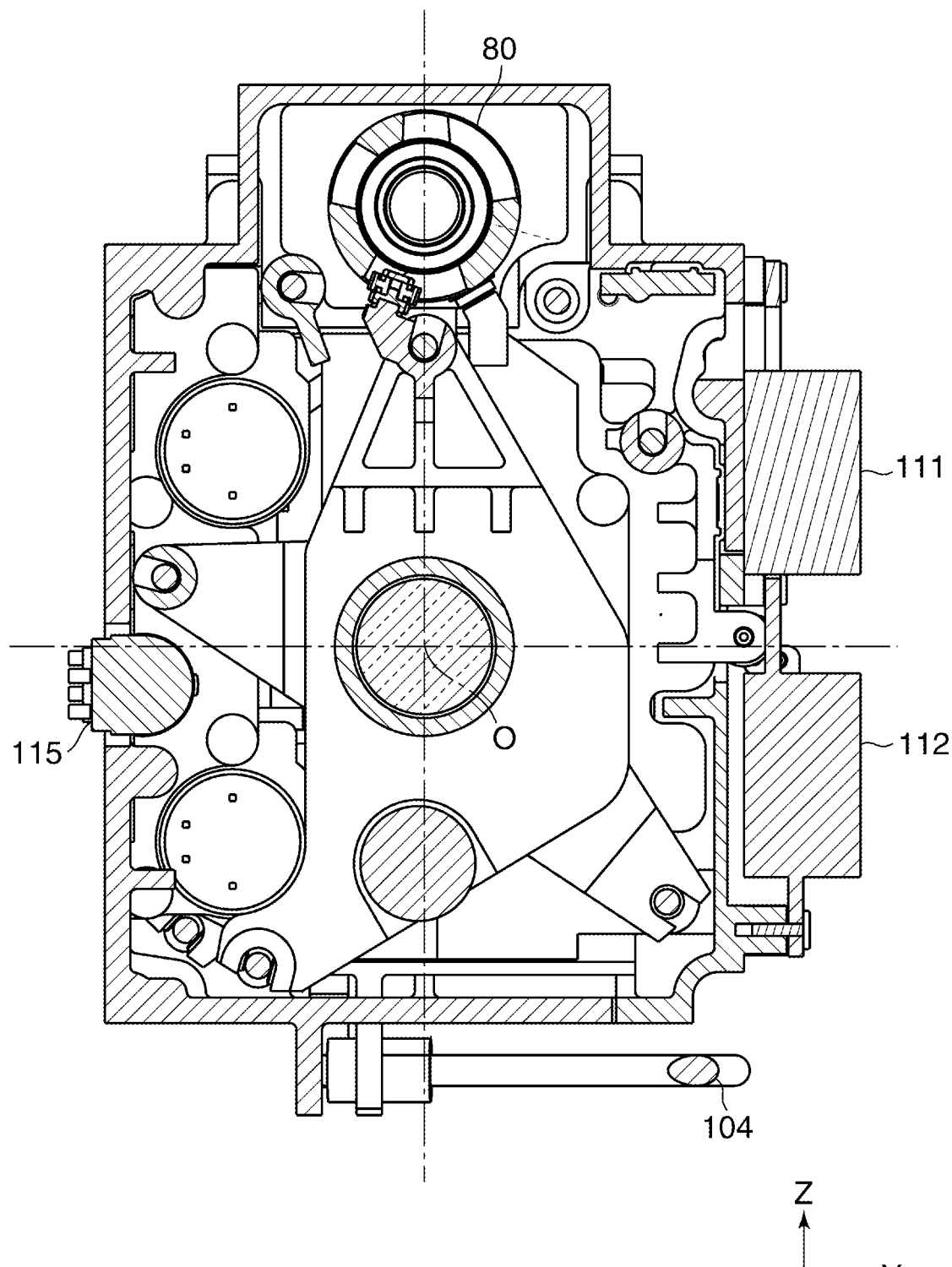
FIG. 6 is a cross-sectional view taken along a plane orthogonal to the optical axis of the image pickup unit of FIG. 1.

FIG. 6 is a cross-sectional view of a cross-section of the image pickup unit 1 cut along a plane (ZX plane) orthogonal to the optical axis when viewed from the front side of the image pickup unit 1. The vibration-type linear actuators 111 and 112 have a substantially rectangular parallelepiped shape and are disposed on a +Y-direction side surface (first side surface) of the image pickup unit 1 such that a shortest side is parallel to the Y axis. That is, the vibration-type linear actuators 111 and 112 are disposed on the image pickup unit 1 such that protrusion from the image pickup unit 1 in in a +Y direction is suppressed. As a result, a width (length of the Y direction) of the entire image pickup unit 1 can be suppressed from increasing. The electric wiring line 104 is disposed on a −Z-direction side surface (second side surface) of the image pickup unit 1 to be bent in a plane substantially parallel to the XY plane. As a result, a height of the entire image pickup unit 1 (length of the Z direction) can be suppressed from increasing.

The cam cylinder 80 is disposed in the vicinity of a +Z-direction side surface (third side surface) of the image pickup unit 1. In addition, the stepping motor 115 is disposed on a −Y-direction side surface (fourth side surface) of the image pickup unit 1. As described above, in the image pickup unit 1, the cam cylinder 80 and the electric wiring line 104 are disposed to face each other with the optical axis therebetween and the vibration-type linear actuators 111 and 112 and the stepping motor 115 are disposed to face each other with the optical axis therebetween. As a result, it is possible to make the image pickup unit 1 compact and well-balanced in shape as a whole.

Figure 7:
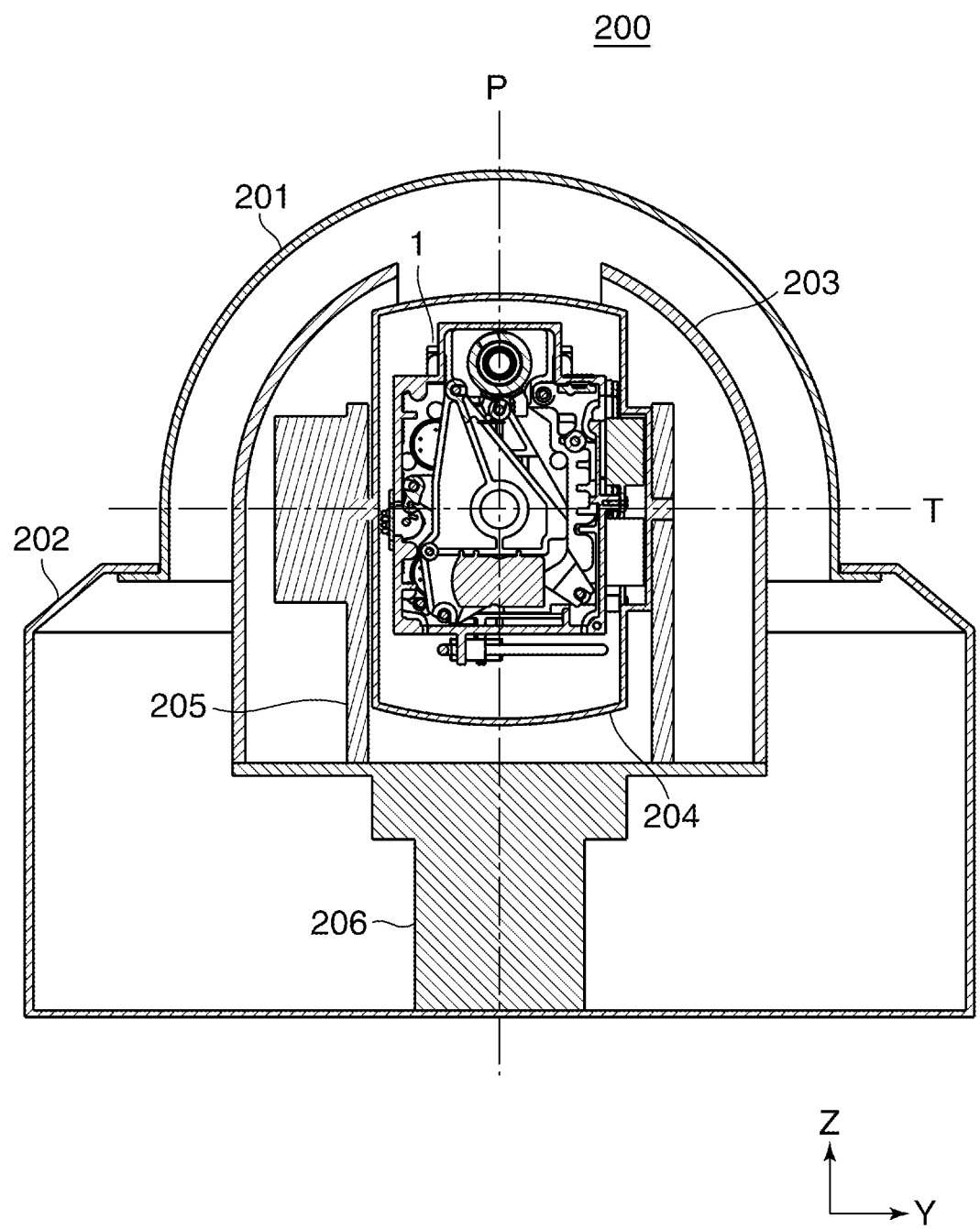
FIG. 7 is a cross-sectional view of a monitoring camera including the image pickup unit of FIG. 1.

FIG. 7 is a cross-sectional view of a monitoring camera 200 to be an example of the image pickup apparatus including the image pickup unit 1, cut along a plane orthogonal to the optical axis. The monitoring camera 200 includes a dome 201, a case 202, an inner cover 203, a camera case 204, a tilt unit 205, and a pan unit 206. The image pickup unit 1 is rotatably held around each of two axes (a tilt axis and a pan axis) in the camera case 204. The tilt unit 205 has a tilt driving unit composed of a stepping motor not shown in the drawings and supports the camera case 204 rotatably around the tilt axis T. By driving the tilt unit 205 and electrically driving the camera case 204 in a tilt direction, the image pickup unit 1 accommodated in the camera case 204 is tilt-driven.

The inner cover 203 is supported by the pan unit 206 in a state in which the inner cover 203 covers the camera case 204 and the tilt unit 205. In addition, the tilt unit 205 is supported by the pan unit 206. The pan unit 206 has a pan driving unit formed of a stepping motor not shown in the drawings and supports the tilt unit 205 rotatably around the pan axis P. By driving the pan unit 206 and electrically driving the tilt unit 205 in a pan direction, the image pickup unit 1 accommodated in a camera case 204 is pan-driven. Therefore, in the monitoring camera 200, the image pickup unit 1 is rotatable around each of the pan axis P and the tilt axis T. The case 202 holds the pan unit 206 therein, accommodates the inner cover 203, and holds the dome 201. The dome 201 is, for example, a hemispherical member formed of transparent or translucent plastic and covers the inner cover 203.

As described above, in the image pickup unit 1, the vibration-type linear actuators 111 and 112 and the stepping motor 115 are disposed on the ±Y-direction side surface and the cam cylinder 80 and the electric wiring line 104 are disposed in the ±Z direction. As a result, because the image pickup unit 1 has a substantially rectangular shape in which the length of the tilt axis T direction (Y direction) is short when viewed from the X direction, the tilt unit 205 (tilt driving unit) is disposed around the tilt axis T and the image pickup unit 1 can be formed in a compact shape as a whole.

Figure 8:
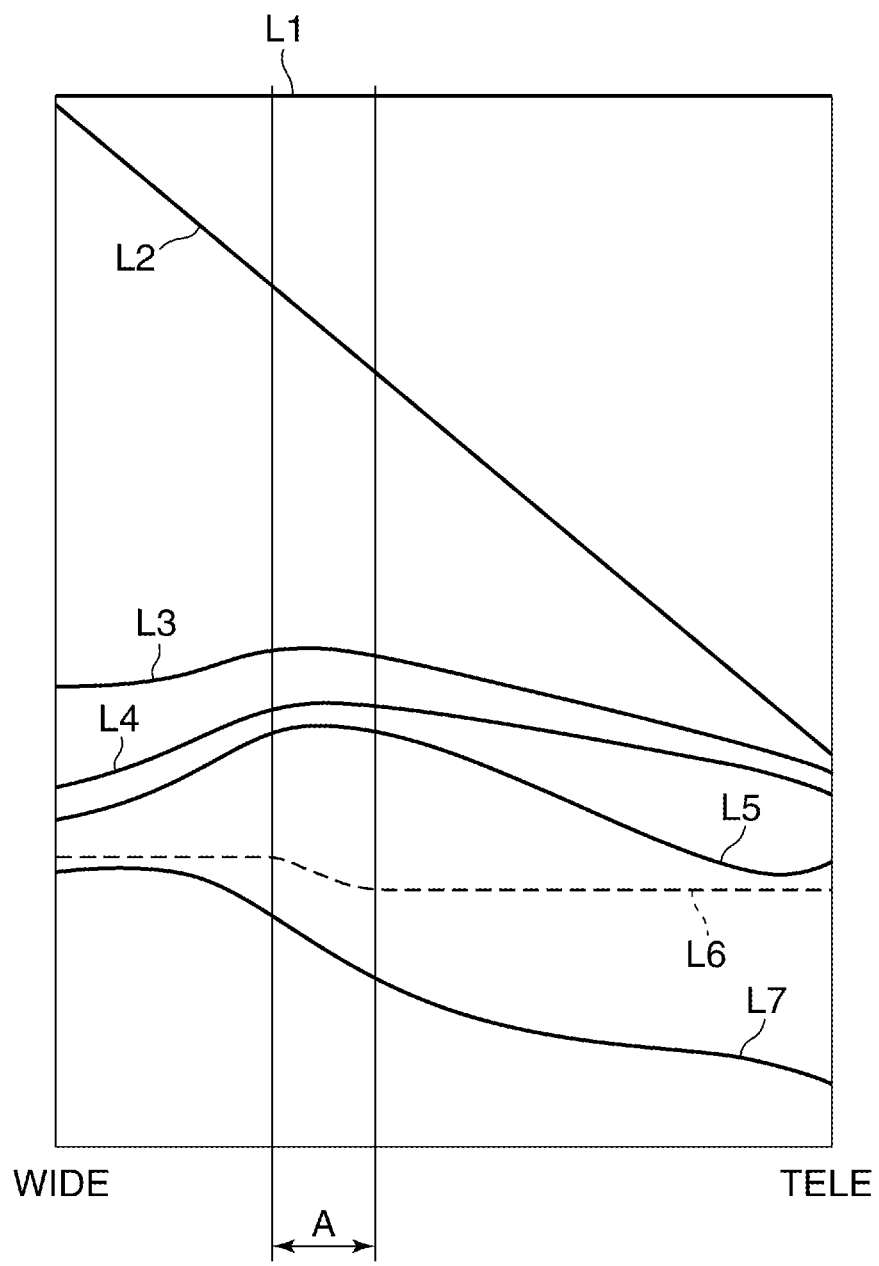
FIG. 8 is a diagram showing a movement locus of a lens group included in the image pickup unit of FIG. 1.

FIG. 8 is a diagram showing movement loci of the first group lens L1 to the fifth group lens L5, the optical filter L6, and the image pickup device L7 constituting an image pickup optical system of the image pickup unit 1. The optical filter L6 moves in the optical axis direction by a minimum distance where the optical filter L6 does not interfere with the fifth group lens L5 and the image pickup device L7. Even if the optical filter L6 moves in the optical axis direction, lengths of the engagement arms 118 and 119 of the optical filter insertion and extraction motors 116 and 117 are set to lengths where engagement between the engagement arms 118 and 119 and the filter holding frames 65 and 67 are maintained. Furthermore, in a zoom range A in which a crossing angle of the third group lens L3 and the fourth group lens L4 moving in the optical axis direction by the rotation of the cam cylinder 80 is small and a rotation torque necessary for the cam cylinder 80 is small, the optical filter L6 moves in the optical axis direction. By this configuration, the optical filter L6 can be moved in the optical axis direction and can be inserted and extracted with respect to the optical path, without increasing a driving load of the vibration-type linear actuator 111. That is, by adopting the configuration in which the driving load of the vibration-type linear actuator 111 is not increased, the durability of the vibration-type linear actuator 111 can be enhanced.

Figure 9:
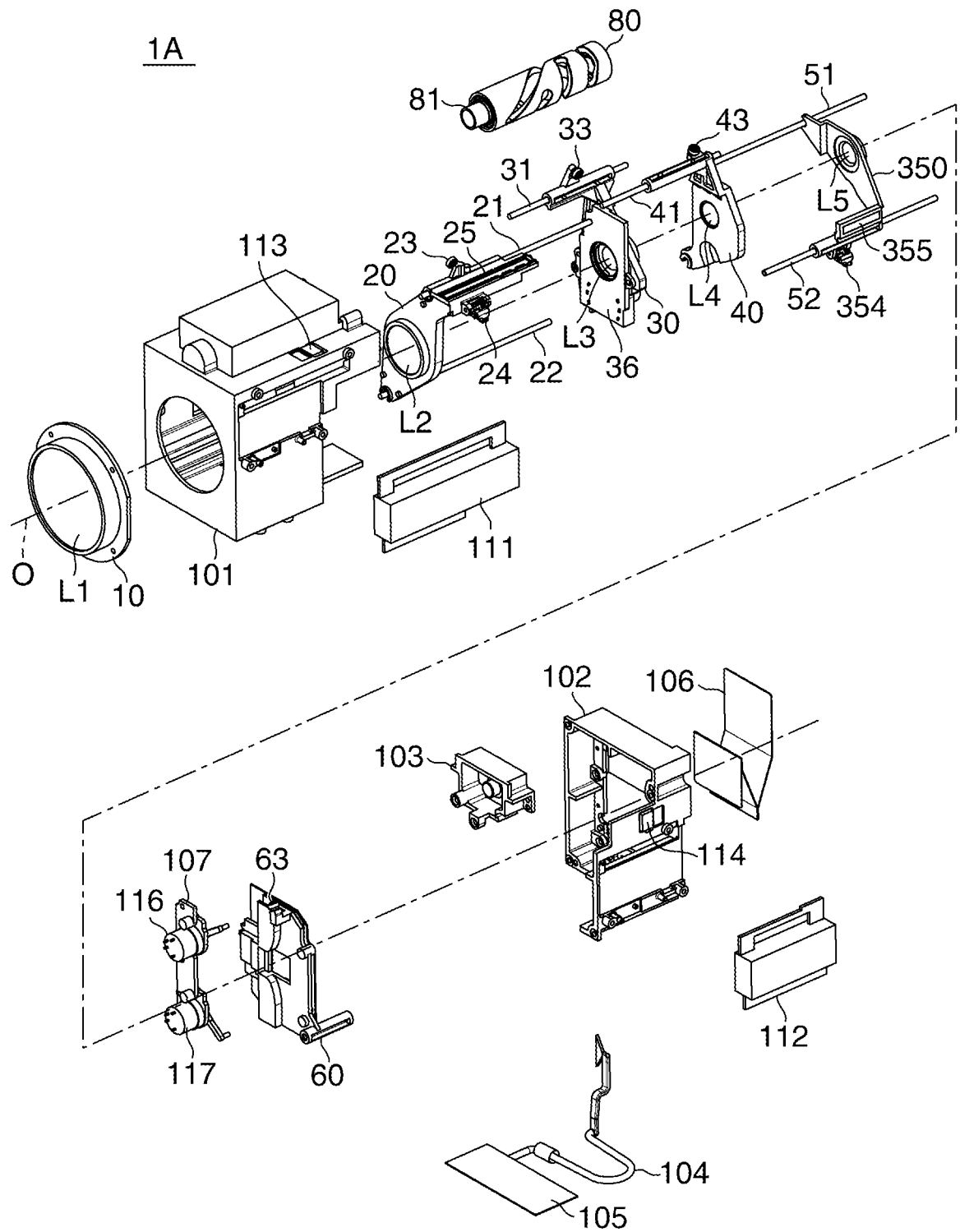
FIG. 9 is an exploded perspective view of an image pickup unit according to a second embodiment of the present invention.

Next, a second embodiment will be described. FIG. 9 is an exploded perspective view of an image pickup unit 1A according to the second embodiment. Among components of the image pickup unit 1A, the same components as the components of the image pickup unit 1 according to the first embodiment are denoted with the same reference numerals and explanation thereof is omitted. Here, a difference with the image pickup unit 1 is mainly described.

In the image pickup unit 1A, a fifth group lens L5 is held by a fifth group barrel 350. A sleeve part of the fifth group barrel 350 is engaged with a guide bar 51 to guide the fifth group barrel 350 in an optical axis direction and a U groove of the fifth group barrel 350 is engaged with a guide bar 52 to regulate rotation of the fifth group barrel 350 around the guide bar 51. A rack member 354 is attached to the fifth group barrel 350 to be rotatable in a plane orthogonal to an optical axis. A position detection scale 355 is fixed to the fifth group barrel 350. An optical sensor 114 detects a position of the fifth group barrel 350 by detecting light of a periodical light/dark pattern reflected by the position detection scale 355 and by converting the light into an electric signal. An image pickup device L7 not shown in the drawings is fixed to a rear part barrel 102.

A vibration-type linear actuator 112 is fixed to the rear part barrel 102 and is engaged with the rack member 354. If a thrust force of the optical axis direction is generated in the vibration-type linear actuator 112, the fifth group barrel 350 moves in the optical axis direction via the rack member 354 and a focusing operation can be performed. By driving a vibration-type linear actuator 111, a second group barrel 20, a third group barrel 30, a fourth group barrel 40, and an optical filter holding frame 60 move in the optical axis direction and a zooming operation can be performed.

In the configuration of the image pickup unit 1 according to the first embodiment, an image pickup device L7 is moved in the optical axis direction by driving the vibration-type linear actuator 112 and a fifth group barrel 50 is moved in the optical axis direction by a stepping motor 115. Meanwhile, in a configuration of the image pickup unit 1A according to the second embodiment, instead of fixing a position of the image pickup device L7 in the optical axis direction, the fifth group barrel 50 is moved in the optical axis direction by driving the vibration-type linear actuator 112 and the stepping motor 115 is not used. As a result, in the image pickup unit 1A, an entire width (Y-direction length) can be suppressed to be smaller than the width of the image pickup unit 1 according to the first embodiment. The image pickup unit 1A is the same as the image pickup unit 1 according to the first embodiment in that the vibration-type linear actuators 111 and 112 are disposed on a ±Y-direction side surface and a cam cylinder 80 and an electric wiring line 104 are disposed in a ±Z direction. Therefore, the image pickup unit 1A can be used in a monitoring camera 200 instead of the image pickup unit 1 according to the first embodiment and can enhance performance of a shooting optical system while suppressing a size increase in the image pickup unit 1A.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, in the image pickup unit 1, the fifth group barrel 50 is driven by the stepping motor 115 and the image pickup device holding frame 70 is driven by the vibration-type linear actuator 112. In contrast, the image pickup device holding frame 70 may be driven by the stepping motor 115 and the fifth group barrel 50 may be driven by the vibration-type linear actuator 112, without changing the arrangement positions of the vibration-type linear actuator 112 and the stepping motor 115.

This application claims the benefit of Japanese Patent Application No. 2017-215593, filed Nov. 8, 2017, which is hereby incorporated by reference herein in its entirety.

What is claimed is:

1. An image pickup unit comprising:
a plurality of first holding members configured to hold optical components respectively and have cam followers, respectively;
a second holding member configured to hold an image pickup device to pick up an image through the optical components;
a housing configured to accommodate the plurality of first holding members;
a first vibration-type linear actuator configured to drive at least one of the first holding members in an optical axis direction of the optical component,
a second vibration-type linear actuator configured to drive the second holding member in the optical axis direction;
a cam cylinder configured to be disposed to be rotatable around an axis parallel to the optical axis and to have cam grooves engaged with the cam followers, respectively, wherein the axis is different from the optical axis,
wherein the first vibration-type linear actuator and the second vibration-type linear actuator are disposed on a first side surface parallel to an optical axis of the housing.

2. The image pickup unit according to claim 1, further comprising:
a heat dissipation part configured to dissipate heat generated by the image pickup device,
wherein the heat dissipation part is folded to be expandable and contractible in the optical axis direction on the rear surface side of the second holding member.

3. The image pickup unit according to claim 1, further comprising:
an electric wiring line configured to be connected to the image pickup device and to be bent according to a movement of the image pickup device in the optical axis direction,
wherein the electric wiring line is disposed on a second side surface orthogonal to the first side surface and parallel to the optical axis in the housing, such that the electric wiring line is bent in a plane orthogonal to the first side surface and parallel to the optical axis when the image pickup device is driven in the optical axis direction.

4. The image pickup unit according to claim 1, wherein the first vibration-type linear actuator is configured to drive one of the first holding members in the optical axis direction and rotate the cam cylinder, permitting another first holding member including another cam follower engaged with the cam groove to be driven in the optical axis direction.

5. The image pickup unit according to claim 1, wherein the cam cylinder is disposed on a third side surface orthogonal to the first side surface and parallel to the optical axis in the housing.

6. The image pickup unit according to claim 1, wherein one of the optical components is an optical filter,
the image pickup unit further comprises an insertion and extraction unit configured to insert and extract the optical filter with respect to an optical path of the optical component, in a plane orthogonal to the optical axis, and
the first holding member holding the optical filter is driven in the optical axis direction in a state in which a position of the insertion and extraction unit in the optical axis direction is fixed.

7. The image pickup unit according to claim 1, wherein one of the optical components is an optical filter,
the first holding member holding the optical filter among the first holding members includes the cam follower engaged with the cam groove, and
a range where the first holding member holding the optical filter is movable in the optical axis direction according to the rotation of the cam cylinder is a range where a rotation torque of the cam cylinder necessary for moving another first holding member including the cam follower to be engaged with the cam groove in the optical axis direction is small.

8. The image pickup unit according to claim 1, further comprising:
    a driving unit configured to drive at least one of the first holding members in the optical axis direction,
    wherein the driving unit is disposed on a fourth side surface parallel to the optical axis and facing the first side surface with the optical axis therebetween in the housing.

9. The image pickup unit according to claim 1, wherein the vibration-type linear actuator includes a slider and a vibrator,
    a substantially spheroidal motion is exited in the vibrator when an alternating voltage signal of a predetermined frequency is input to the vibrator, and
    the slider moves with the driving objects.

10. An image pickup apparatus comprising:
    the image pickup unit according to claim 1;
    two driving units configured to rotate the image pickup unit around two axes orthogonal to each other, respectively; and
    a hemispherical cover configured to cover the image pickup unit.

11. The image pickup apparatus according to claim 10, wherein one of the two axes is orthogonal to the first side surface and the other of the two axes is orthogonal to the optical axis and is orthogonal to the one of the two axes.

* * * * *